United States Patent

[11] 3,556,529

| [72] | Inventor | Lois Layton Noriega<br>3108 Dewey St., Tampa, Fla. 33607 |
|---|---|---|
| [21] | Appl. No. | 751,151 |
| [22] | Filed | Aug. 8, 1968 |
| [45] | Patented | Jan. 19, 1971 |

[54] EDUCATIONAL DOMINOES WITH MAGNETIC CONNECTORS
5 Claims, 4 Drawing Figs.

[52] U.S. Cl. ..................................................... 273/137,
46/26, 46/31
[51] Int. Cl. ..................................................... A63f 9/20
[50] Field of Search ........................................... 273/137,
137(A), 137(AB), 137(B), 137(C), 137(D);
46/25, 26, 30, 31; 35/31(8), 35(9), 69, 70, 71, 72;
40/140, 142(A)

[56] References Cited
UNITED STATES PATENTS

| 1,408,210 | 2/1922 | Knauber .................... | 40/140 |
| 2,570,625 | 10/1951 | Zimmerman et al. .......... | 35/71X |
| 2,708,329 | 5/1955 | McKee ........................ | 46/31 |
| 3,330,052 | 7/1967 | Hendrix ...................... | 273/137(C) |
| FOREIGN PATENTS | | | |
| 217,252 | 9/1958 | Australia ..................... | 46/25 |
| 1,505,611 | 11/1967 | France ........................ | 35/31(8) |
| 22 | 1915 | Great Britain ................ | 273/137(B) |
| 1,049,571 | 11/1966 | Great Britain ................ | 273/137(A) |

*Primary Examiner*—Anton O. Oechsle
*Attorneys*—Clarence A. O'Brien and Harvey B. Jacobsen ABSTRACT: A set of domino-type blocks include indicia thereon representing the face of a timepiece. Magnetic elements are embedded within the blocks so that adjacently positioned blocks may be retained in a semipermanent arrangement. Further, a magnetic I-connector is positioned between confronting, adjacently positioned blocks thereby retaining these adjacently positioned blocks in coplanar relation.

PATENTED JAN 19 1971  3,556,529

Lois Layton Noriega
INVENTOR.

BY Clarence A. O'Brien
and Harvey B. Jacobson
Attorneys

EDUCATIONAL DOMINOES WITH MAGNETIC CONNECTORS

The present invention relates to learning aids and more particularly to domino block games.

In the past, process of teaching young children the concept of time and other mathematical relationships was considered the sole province of an experienced teacher and was restricted to children of school age.

Modern psychological research has proven that a great deal of learning is possible by preschool age children who possess an insatiable desire to learn. The present educational game basically resembles the game of dominoes with some marked modification in the structure as well as the indicia borne thereon. Firstly, instead of the raised dot-like indicia on conventional dominoes, each block of the present invention includes two clock faces with hands inscribed thereon which indicate hours of the day.

In order to adapt the present educational game for young, preschool age children, magnetic elements are embedded into each block permitting a semipermanent layout of adjacently disposed blocks. Further, a magnetic I-shaped connector is inserted between adjacently disposed blocks to retain these adjacently disposed blocks in coplanar relation. The game is played according to the rules of dominoes and enables a young child to learn the concept of time without the continuous supervision of an adult. In order to facilitate the learning process, each particular indicated hour is distinguished from the rest by means of coloring the clock hands a distinct color, representative of a particular indicated time.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
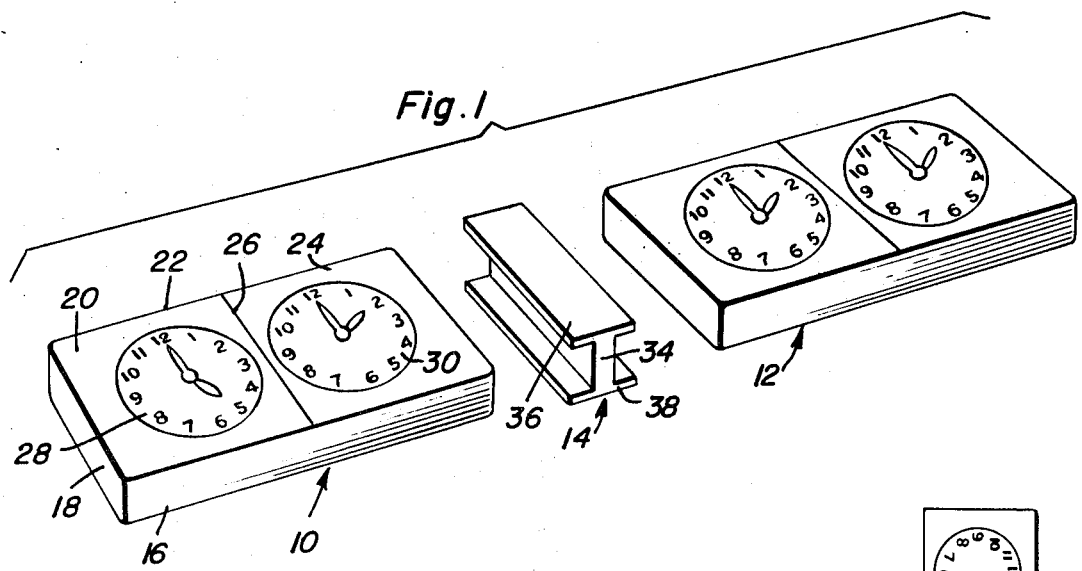
FIG. 1 is a disassembled perspective view illustrating the domino-type blocks of the present invention and a magnetic I-shaped connector for retaining the blocks in adjacently positioned relation.

Referring specifically to the drawings, a preferred embodiment of the present invention is illustrated in FIG. 1 which shows a first domino-type building block 10 placed adjacent adjacent a second building block 12 in accordance with the conventional rules of dominoes. In order to retain the building blocks 10 and 12 in coplanar relation, a magnetic I-shaped connector 14 is positioned intermediate confronting edges of building blocks 10 and 12.

The particular structure of a building block includes oppositely disposed elongated longitudinal lateral wall surfaces 16. Each building block further includes foreshortened transverse lateral wall surfaces 18 oppositely disposed from one another and oriented at right angles to the longitudinal lateral wall surfaces 16. Two oppositely disposed rectangular planar surfaces 20 comprise the major surfaces of a particular building block thereby completing the parallelopiped geometry of a building block. One of the major surfaces 20 is divided into two equal areas 22 and 24 as evidenced by a conventional domino block. A transverse dividing line 26 extending between the longitudinal edges of major surface 20 separates the two equal areas. At this point, the appearance of the present building block departs from that of a conventional domino block insofar as the conventional dot pattern of a domino block is replaced by an embossed or imprinted clock face appearing in each of the aforementioned major surface areas 22 and 24. The present invention contemplates a group of twenty-eight building blocks in a set, thereby corresponding with the number of blocks in a conventional domino set. The time indicated by the clock faces on each building block indicates hours corresponding to the dot patterns on a related domino block. Thus, each block in the present set includes two clock faces indicating different times of the day ranging from 1 to 6 o'clock. Further, several blocks include a clock face without hands to correspond to a blank domino block area. As illustrated in FIG. 1, a major surface 20 of each building block includes two adjacently spaced clock faces 28 and 30. Each particular hour is color-coded by correlating the clock hands indicating a particular hour with a particular color. Accordingly, a child may first be taught to match building blocks according to the color-coded clock faces.

Figure 3:
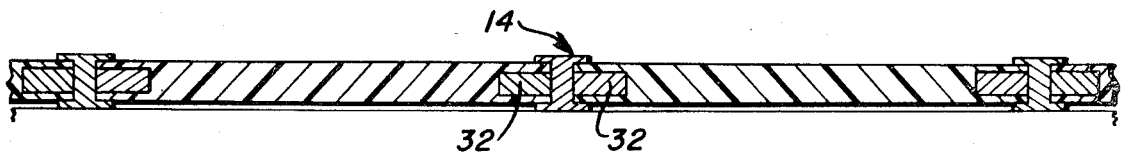
FIG. 3 is a vertical cross-sectional view taken along a plane passing through section line 3–3 of FIG. 2.
Figure 4:
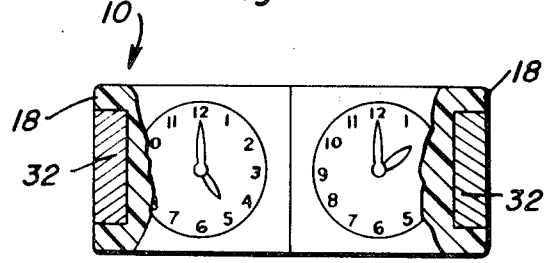
FIG. 4 is a partially cut away top plan view of a typical playing block.

Referring to FIGS. 3 and 4, each of the present building blocks may be fabricated from a suitable material such as hardwood, plastic or the like. In order to assist young children in retaining the placed building blocks in a semipermanent condition, magnetic elements 32 are embedded or recessed within the transverse lateral walls 18 of each building block.

Attention is directed to FIG. 1 which illustrates a magnetic I-connector 14 in detail. In particular, the connector may be characterized as an elongated member having an I-shaped cross section. The connector includes a first elongated web portion 34 appending at oppositely disposed edges in elongated flange members 36 and 38.

Figure 2:
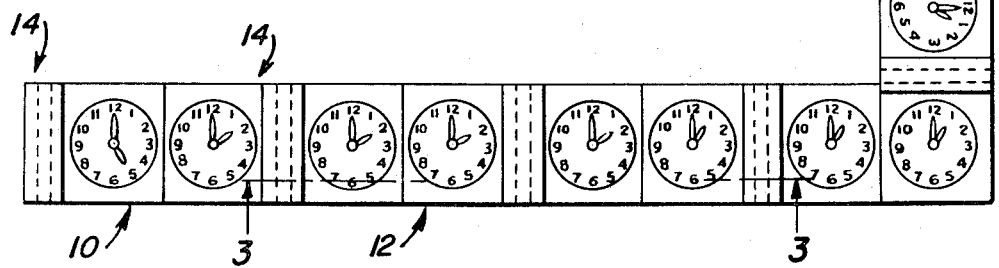
FIG. 2 is a top plan view of a series of interconnected playing blocks.

In playing the present educational game, the blocks are stacked adjacent one another according to the rules of dominoes, as shown, by way of example, in FIG. 2. As illustrated, each clock face on a particular building block must be placed adjacent a clock face of another building block indicating the same hour. As will be noted from FIG. 2, a magnetic I-shaped connector 14 is disposed between confronting magnet-containing edges of adjacently situated building blocks. As the game commences, a pattern of building blocks is developed by the players of the game until one of these players is able to expend all of his originally possessed building blocks. At this time, this player is declared the winner. As will be appreciated, although the present educational game serves as a pleasurable pastime, the primary purpose of the game is to teach children to recognize time by virtue of an enjoyable method.

It is to be emphasized that although the preceding description has been explained in terms of building block indicia indicating a clock face, it is contemplated that the present invention may be utilized to teach other concepts to young children. Thus, the same block structure and game rules may be employed with a building block set having indicia other than clock faces. Indicia representing the following concepts maybe imprinted upon the building blocks instead of the clock face: days of the week, months of the year, sectorized circles representing fractions, geometric shapes, mathematic symbols, and the like. In all of the above variations, each particular indicia is distinguished from the others by a particular color code as previously utilized in connection with the clock faces.

From a reading of the foregoing, it will be appreciated that the primary object of the present invention is to provide a means of teaching children various concepts in a pleasurable manner. When playing the present game, a child learns to distinguish between colors; learns to tell time on the hour; develops the ability to recognize the cardinal numerals one through twelve; uses the blocks for building and developing an ability to interconnect adjacently disposed blocks. By including magnetic inserts within each block, a child develops an appreciation for the principles of magnetism, as he learns that like poles repel and opposites attract.

In one particular embodiment of the present invention, the clock faces may be raised or depressed in relation to the domino block surface. Thus, the invention is an invaluable aid in teaching blind children the aforementioned concepts as well as providing a means of entertaining them.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A plurality of parallelopiped blocks, each said block having an elongated longitudinal dimension, a relatively foreshortened thickness, and oppositely disposed major planar surfaces, a major surface of each said block further being divided into two areas, each said area including indicia thereon, certain of said blocks including two identical indicia in said areas and certain other of said blocks including two dissimilar indicia, a spaced pair of ferromagnetic elements attached edgewise to each said block, and a plurality of magnetic connector means for attracting the elements of preselected adjacently disposed blocks and retaining the same in said adjacently disposed position, said connector means being an elongated I-shaped connector with a central portion abutting confronting edges of adjacently disposed blocks, said connector further having oppositely disposed and spaced portions for retaining underlying portions of adjacently disposed major block surfaces in coplanar relation.

2. The game as set forth in claim 1 wherein said ferromagnetic elements are magnetized.

3. The game set forth in claim 1 wherein each said connector is fabricated from a magnetized material.

4. The game set forth in claim 1 wherein said ferromagnetic elements and each said connector are fabricated from a magnetized material.

5. The game set forth in claim 1 wherein each indicia represents the face of a timepiece.